United States Patent [19]
Baca et al.

[11] Patent Number: 5,638,347
[45] Date of Patent: Jun. 10, 1997

[54] DISK CARTRIDGE STORAGE SYSTEM

[75] Inventors: Francisco A. Baca; Chi-Hung Dang; Chi-Thanh Dang; Kamal E. Dimitri; Rodney J. Means; Raymond Yardy, all of Tucson, Ariz.

[73] Assignee: International Business Machines Corporation, Armonk, N.Y.

[21] Appl. No.: 468,843

[22] Filed: Jun. 6, 1995

[51] Int. Cl.$^6$ ............................. G11B 17/22; G11B 17/04
[52] U.S. Cl. ........................ 369/34; 369/36; 369/178; 369/192; 360/98.04
[58] Field of Search .................................. 369/33, 34, 36, 369/38, 178, 179, 191, 192, 193, 194; 360/91, 92, 98.01, 98.04, 98.06

[56] References Cited

U.S. PATENT DOCUMENTS

| | | | |
|---|---|---|---|
| 4,675,856 | 6/1987 | Rudy et al. | 369/36 |
| 4,730,727 | 3/1988 | Petroff | 206/311 |
| 4,945,428 | 7/1990 | Waldo | 360/92 |
| 4,945,530 | 7/1990 | Sandell et al. | 369/291 |
| 4,974,156 | 11/1990 | Harding et al. | 364/200 |
| 4,987,533 | 1/1991 | Clark et al. | 364/200 |
| 5,056,073 | 10/1991 | Fitzgerald et al. | 369/36 |
| 5,123,000 | 6/1992 | Fitzgerald et al. | 369/36 |
| 5,253,246 | 10/1993 | Leonhard et al. | 369/291 |
| 5,255,251 | 10/1993 | Fitzgerald et al. | 369/36 |
| 5,303,214 | 4/1994 | Kulakowski et al. | 369/34 |
| 5,357,495 | 10/1994 | Solhjell | 369/34 |
| 5,396,475 | 3/1995 | Nakagawa et al. | 369/36 |
| 5,442,500 | 8/1995 | Hidano et al. | 369/34 |
| 5,499,233 | 3/1996 | Childers et al. | 369/291 |
| 5,548,571 | 8/1996 | Mistretta | 369/291 |

FOREIGN PATENT DOCUMENTS 61-168186  7/1986  Japan .......................... 360/133

OTHER PUBLICATIONS

"Optical Disk Cartridges for Information Interchange," ISO/IEC JTCI SC23/WG2 13842 Editing Meeting, Apr. 1994—Herndon, VA.

"Proposed Specifications for 130mm Optical Disk Cartridges, Rewritable and WORM Using Phase Change Technology and Embossed Read–Only Capacity: 2,0 gigabytes per cartridge." Doc.No. X3B11/94–103, 4th Draft, X3 Secretariat, Computer and Business Equipment Manufacturers Association (CBEMA), Aug. 1, 1994, Washington, D.C.

International Standard, "Information technology—130 mm rewritable optical disk cartridge for information exchange," ISO/IEC 10089, First Edition, 1991-05-01.

*Primary Examiner*—Stuart S. Levy
*Assistant Examiner*—David L. Ometz
*Attorney, Agent, or Firm*—Charles E. Rohrer

[57] ABSTRACT

A library of disk media units for use in a data processing environment wherein receptacle columns hold multiple cartridges which in turn hold multiple media units comprised of caddies and recording disks. A picker system moves media into and from the drive units and receptacle columns. Drive units are also located within the receptacle columns. The caddies and cartridges are supplied with hole patterns to coact with optical sensors within the receptacle columns and thereby provide information to the library controller indicating the proper/improper operation of the picker system in positioning media units. Also, the hole pattern on the media unit enables the sensors to provide informational content about the media unit to the processor.

13 Claims, 5 Drawing Sheets

DISK CARTRIDGE STORAGE SYSTEM

This invention relates to disk storage devices for use with data processing equipment and more particularly to the design of a disk storage system including media units each comprised of a caddie for holding an individual disk, cartridges for holding multiple media units, and storage receptacles for holding a plurality of cartridges.

BACKGROUND OF THE INVENTION

Data for use in computing systems is stored on various types of media, including magnetic tapes, magnetic disks and optical disks. Rather than manually loading media units into a device capable of reading and recording the data located on the media, automated storage libraries have been developed. Such libraries employ open faced receptacle columns each having a plurality of storage compartments for passively storing the cartridges holding the media. Associated with the receptacle columns, is a picker mechanism which can remove a media unit from its location within the storage compartment and move it to a disk drive which can record or read data. After the recording or reading process within the drive unit, the media unit is moved by the picker mechanism back to the storage compartment.

It is an object of the present invention to provide a storage system capable of storing large quantities of magnetic or optical disk media within a given storage space. It is another object to provide an optical sensing system within each receptacle column to interact with specifically designed media units to derive various information therefrom.

SUMMARY OF THE INVENTION

This invention relates to an automated library with receptacle columns which have storage spaces for holding removable recording disks. The system includes a cartridge for holding a plurality of recording disks wherein each recording disk is placed within a specially designed caddie. The combination of the caddie and the recording disk comprises a media unit.

The cartridge is designed for use with a receptacle column such that the column and the cartridge interact to locate and hold the cartridge in a proper position within the receptacle column. The column also has an input/output station of similar design wherein a cartridge containing multiple media units can be manually placed into the I/O station and properly positioned and held therein. In that manner a picker assembly may retrieve each of the media units from a cartridge in the I/O station and move them to storage slots within the receptacle columns. Conversely, when a media unit is no longer required in the library, the picker units may move that media unit from the storage slot to a cartridge in the I/O station. Alternatively, the picker may move an entire cartridge from or to the I/O station.

The receptacle columns are equipped with an optical sensing unit for determining when cartridges and media units are properly positioned within both the storage receptacles and the I/O station. The cartridges and the media units are equipped with transparent areas such as cut-out areas or holes to form an optical path through which a light beam can pass. When a media unit is removed or inserted, the optical sensing unit observes the movement and, through interaction with specially designed cut-out areas within the media unit, can determine information relative to the media unit. The optical sensing unit also observes correct or incorrect movement of media units by the picker mechanism as well as correct or incorrect placement of cartridges manually into or out of the I/O station.

The above-mentioned and other features and objects of the invention and the manner of attaining them will become more apparent and the invention itself will be best understood by reference to the following detailed description of the invention taken in conjunction with the accompanying drawing.

BRIEF DESCRIPTION OF THE DRAWING

The invention is set forth in detail below with reference to the accompanying drawing a brief description of which follows.

FIG. 1 is a perspective view of a data storage library exploded to show some components therein.

FIG. 4 is a diagrammatic plan view showing the orientation of cartridges within storage receptacle columns with a picker mechanism located between.

DETAILED DESCRIPTION OF THE INVENTION

When reference is made to the drawing, like numerals indicate like parts and structural features in the various figures.

Figures 1, 4:
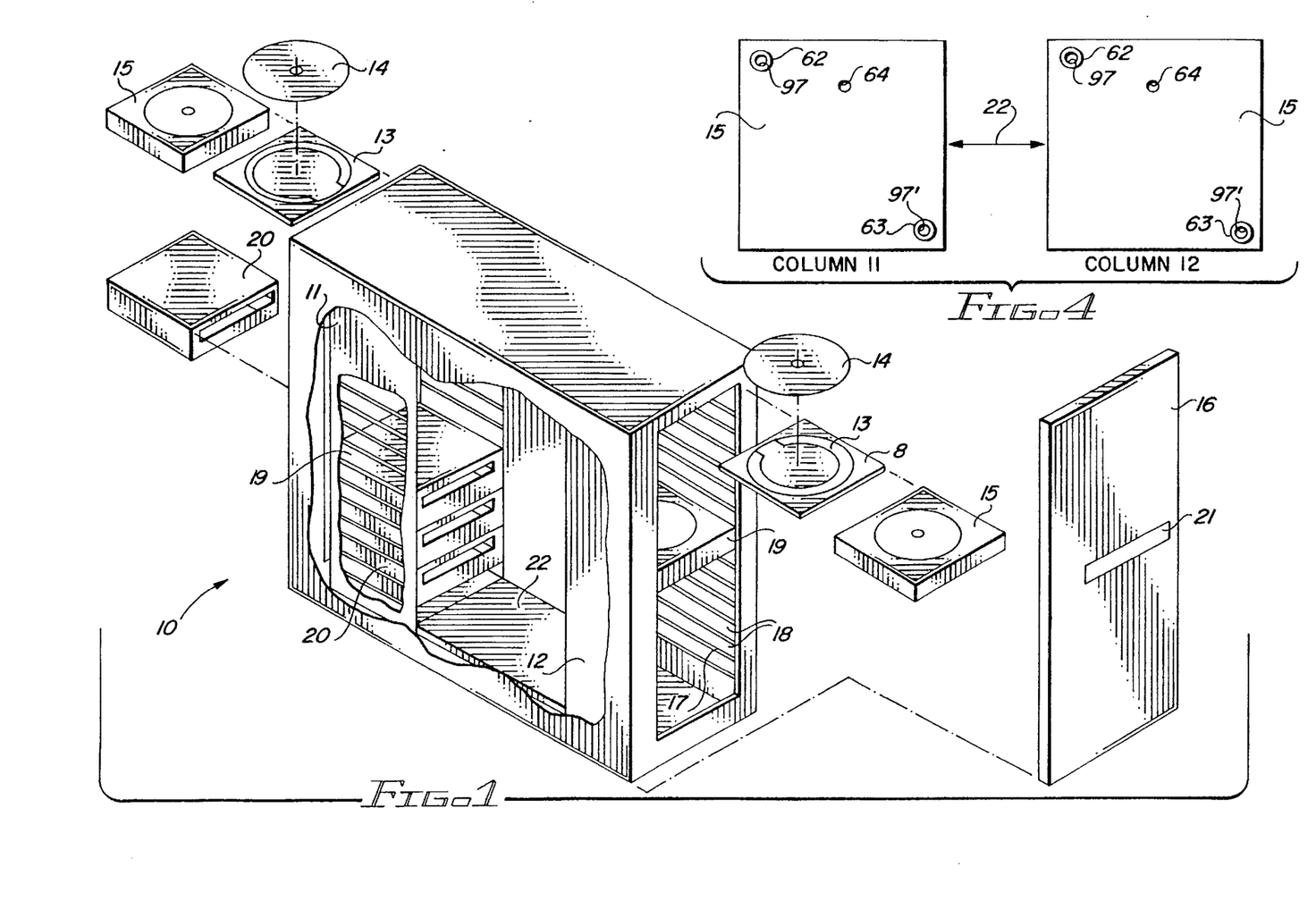

FIG. 1 shows a library device 10 for holding a large number of data records stored on optical or magnetic disks. The device 10 is generally termed a data storage library and in the configurations shown in FIG. 1 is comprised of two receptacle columns 11 and 12. The receptacle columns are designed to hold a large number of media units comprised of a caddie 13 and a recording disk 14. Multiple numbers of media units are contained within a cartridge or magazine 15.

In the exploded view shown in FIG. 1, the front cover 16 is removed from the receptacle column 12 to show a large number of horizontally disposed rails 17 within the receptacle column 12. Such rails are located on each side of the receptacle column to form slots 18 between upper and lower rails. The cartridges 15 fit into the slots 18 between rails 17 and are thereby positioned within the storage receptacles as shown by cartridge 19. Storage receptacle column 11 is of the same construction as column 12 and can also hold multiple numbers of cartridges 15 which in turn hold multiple numbers of media units comprised of caddie 13 and recording disk 14.

Included within one or both receptacle columns will be at least one drive unit 20 into which the media units may be placed for writing and reading data to and from the recording disks 14. Preferably, the drives 20 are of the same external width dimension as the cartridges 15 so that the drives 20 fit into the storage receptacles within slots 18 between rails 17 in the same manner as do the cartridges 15. A number of drives 20 are shown in FIG. 1 located in column 11.

An input/output station is shown in FIG. 1 located in storage column 12 with a cartridge receiving opening 21 located in front cover 16. A cartridge 15 is inserted into opening 21 and positioned properly within the storage column 12. In that manner media units contained within a cartridge 15 at the input/output station are made available to the storage library.

A picker system 22 is located within the library device 10 between the storage receptacle columns 11 and 12. Picker system 22 is capable of moving in a vertical manner and being positioned at any of the slots within the receptacle columns. The picker mechanism is capable of grasping a selected media unit and removing or inserting that media unit into a cartridge located in the storage receptacle. It can also move with the media unit to a different location within the storage receptacle or to a drive unit for inserting the media unit into the drive. Upon completion of activity in the drive, the media unit may be removed from the drive by the picker system and moved back to a chosen position within the storage receptacle columns. When media units are to be inserted or removed from the storage receptacle columns the picker system 22 moves the media units to or from the input/output station.

Figure 2:
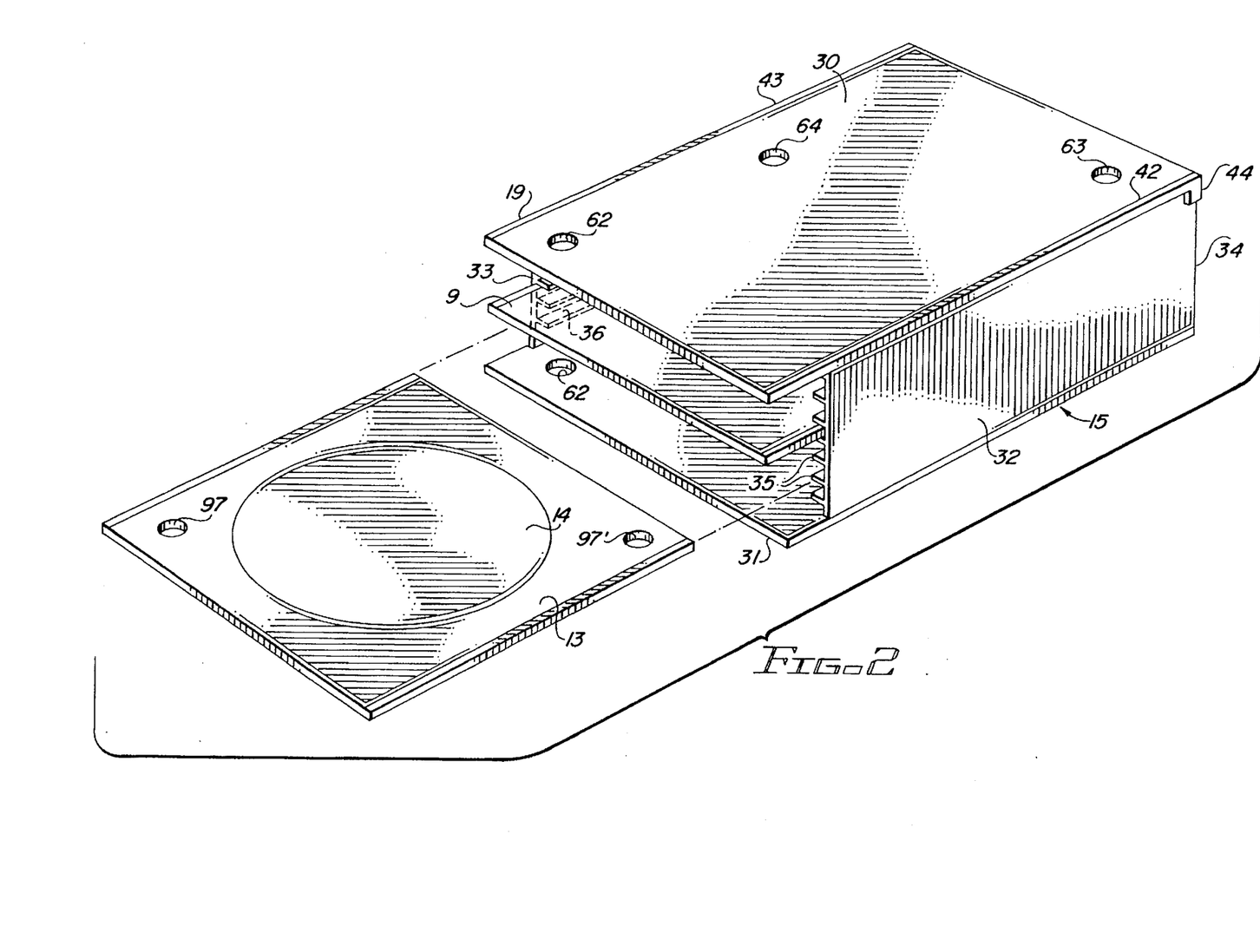
FIG. 2 shows a cartridge and caddie for use with this invention.

FIG. 2 shows a perspective view of the cartridge 15 and the caddie 13. The cartridge 15 is a box-like configuration of rectangular cross section and is comprised of a top cover 30, a bottom cover 31, side walls 32 and 33 and a back wall 34. The cartridge is closed at the rear by back wall 34 but is open at the front so that media units can be inserted or removed from the cartridge. A succession of horizontally disposed rails 35 are shown along each of the side walls 32 and 33. The rails 35 form slots 36 between each of the rails. Caddies are of the proper width to fit into the cartridge into a slot 36. A succession of slots 36 within the cartridge 15 enables the cartridge to hold a multiple number of media units. Eight such slots are shown in cartridge 15 in FIG. 2. A media unit 9 is shown positioned in one of the slots while a second media unit comprised of caddie 13 and disk 14 is shown removed from the cartridge.

Rails 42 and 43 are located along the upper edge of cartridge 15 at each of the side walls 32 and 33 and overhang the side walls so that when the cartridge 15 is inserted into receptacle columns shown in FIG. 1, the rails 42 and 43 cooperate with the rails 18 so that the cartridges are hung in place within the receptacle column. A stop projection 44 is shown along the rail 42 in FIG. 2 to properly position the cartridge within the slots of the receptacle columns. A break (not shown) in the column rails 17 in FIG. 1 interacts with stop projection 44 to position the cartridge.

The top cover 30 and the bottom cover 31 contain transparent portions or holes 62, 63 and 64 to allow a light path to pass through the cartridge. The caddie 14 has holes 97 and 97' for the same purpose.

Figure 3:
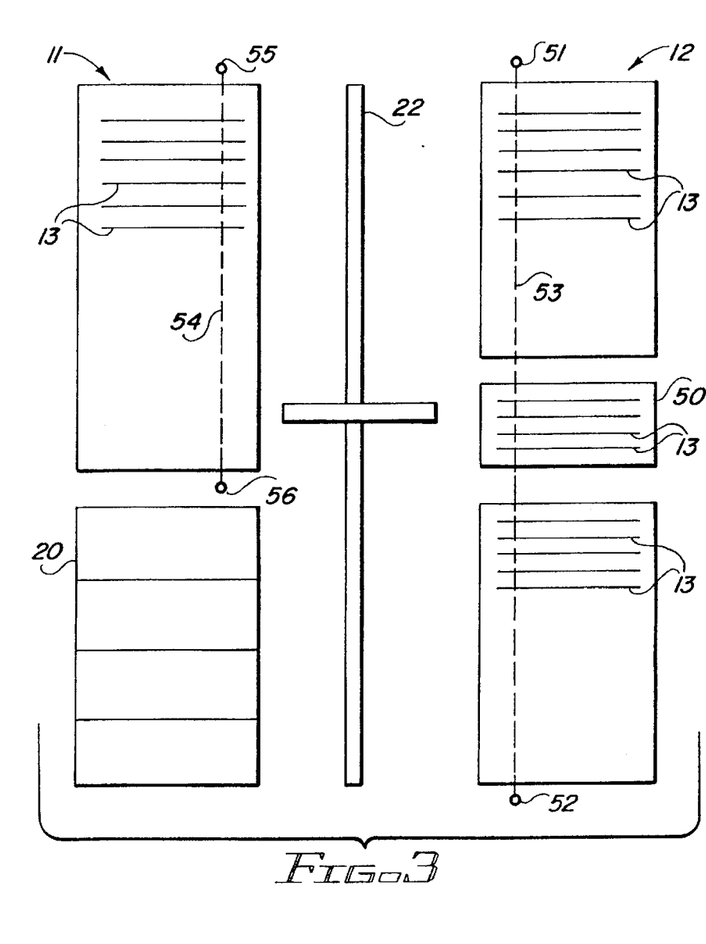
FIG. 3 is an elevational view of the library of FIG. 1, showing the location of an optical path through the storage receptacle.

FIG. 3 is a diagrammatic elevational view of the two storage receptacle columns 11 and 12 with a picker mechanism 22 shown between the two columns. The I/O station 50 is at roughly the mid-point of storage receptacle column 12 and drive units 20 are located along the bottom portion of storage receptacle column 11. It was noted above that the cartridges 15 may be located within the slots 18 of the receptacle columns and the media units may be located within the cartridges. An alternative configuration is to place the rails 17 more closely together so that the slots 18 take a narrower width and instead of inserting cartridges to hold media units within the slots 18 of storage receptacle columns 11 and 12, the media units may be individually located in the slots 18. In any event, the picker mechanism 22 functions to remove or insert media units from the receptacle columns and transport the media units to or from the proper receptacle storage location and to and from the drives 20. The number of drives is a matter of choice.

FIG. 3 shows the position of an optical sensor unit comprised of a transmitter 51 and a receiver 52 utilizing an optical path 53 within receptacle column 12. FIG. 3 also shows a second optical path 54 located in storage receptacle 11 extending from transmitter 55 to receiver 56. The optical path 53 is arranged to extend through all media units and cartridges which may be placed into the storage column 12. Thus, any properly positioned cartridges and media units in the I/O station 50 and any properly positioned cartridges or media units within the storage receptacle column above and below I/O station 50 are located within the optical path 53. Similarly, in column 11 the optical path 54 extends through all properly positioned media units and/or cartridges that can be placed within column 11. With reference to both FIGS. 1 and 3, the optical path 53 is positioned toward the back of column 12 on the picker side and the optical path 54 is positioned toward the front of column 11 on the picker side. In order for the light path to extend from the transmitter to the receiver, cut-out portions (holes) must be included in the top cover and bottom cover of each cartridge and in all of the caddies so that the optical path can pass through the cartridges and the caddies.

FIG. 4 is a top view of cartridge 15 and shows the location of hole 62 in the top cover of the cartridge and hole 97 in caddie 13 located within the cartridge in order to accommodate optical path 53. When the cartridge and caddie are properly positioned in column 12, hole 97 allows completion of the optical path 53 through the caddie from the optical emitter to the optical receiver. A cut-out area 62 is located in the top cover and a corresponding hole is located in the bottom cover of the cartridge so that when the cartridge is properly positioned the light path 53 passes through the top and bottom covers of the cartridge as well as through the hole 97 in each of the media units properly positioned in the cartridge.

A cartridge may be manually placed into the I/O station 50 and properly positioned. A caddie 13 may be removed from the cartridge at the I/O station by the picker system 22 and moved to another receptacle in column 12. When all cartridges and caddies are properly positioned, light for optical path 53 passes unimpeded from the emitter to the receiver 52.

The caddie 13 may be removed from the cartridge at the I/O station by the picker system 22 and moved to the receptacle column 11. When properly positioned at column 11, the cut-out area 97' in the caddie allows completion of the optical path 54 through the media unit. When a cartridge is properly positioned in column 11 the hole 63 allows optical path 54 to pass through the top and bottom covers of the cartridge. Thus the cut-out areas 62 and 63 in the cartridge and the holes 97 and 97' in the caddie enable a sensing system comprised of optical paths 53 and 54 to determine when media units are not properly positioned or when a cartridge is not properly positioned in either a receptacle slot or in an I/O station receiving slot. Cartridge hole 64 may be used to determine if at least one disk is present in the cartridge, since hole 64 is positioned in an area that can be covered by a disk if one is present. Thus, when hole 64 is blocked, at least one disk is present in the cartridge.

Cartridge hole 62 can be used to determine if a caddie is present in the cartridge. Picker assembly 22 is utilized to move each caddie contained in a cartridge loaded into the I/O station to a point where the caddie would block hole 62 and thereby block the optical path 53 if the caddie were present. If it is, the caddie can be moved to a drive to find its identity and track its location as it is moved around the library.

It should be noted that the holes in the caddie may be covered with transparent material. The cut-out areas or holes in the cartridge may be a transparent top surface and a transparent bottom surface. Any suitable framework for enabling light to pass through the cartridge and enable the light path to view holes in the caddies contained therein, is acceptable.

Figure 5:
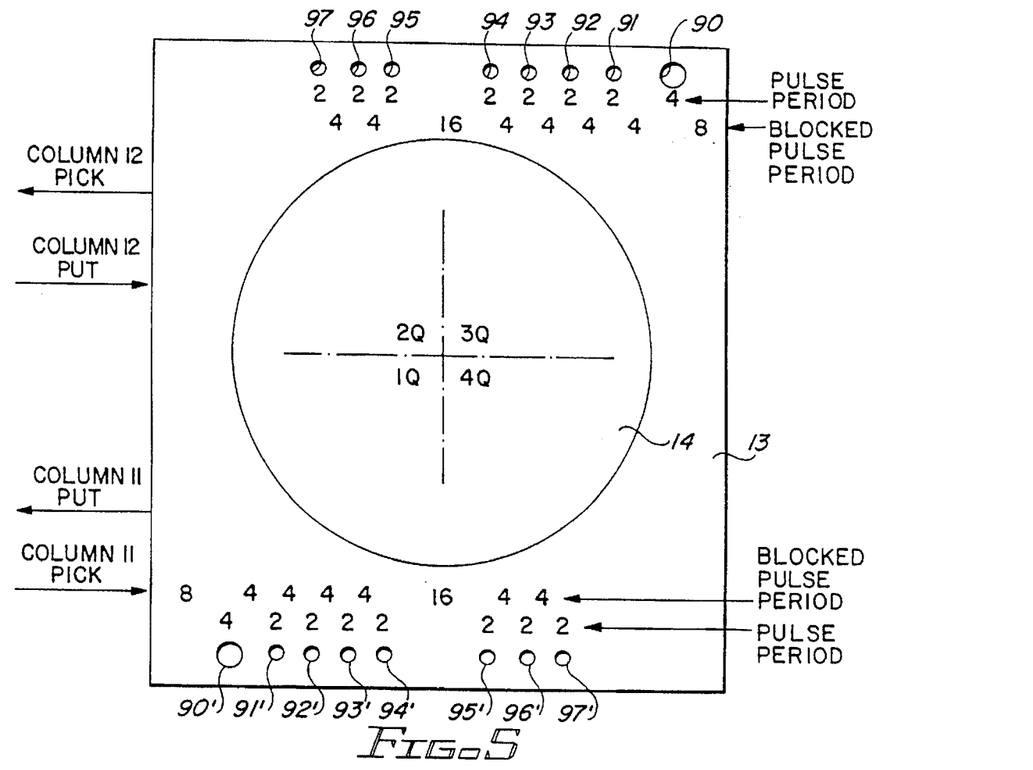
FIG. 5 shows a caddie with a particular structure of cut-out areas for cooperation with the optical sensor units.

FIG. 5 shows a caddie with a specific hole pattern in order to provide information. The hole pattern shown in FIG. 5 enables a single optical path to monitor picker exchanges whether removing or inserting a caddie into a receptacle column. In that manner, the sensor can report caddie identification or report failures to the controller in order to initiate error recovery procedures.

Caddie 13 in FIG. 5 has an asymmetrical pattern of holes with holes 90–94 in the third quadrant and holes 95, 96 and 97 in the second quadrant. When properly positioned in receptacle column 12, light for optical path 53 passes through hole 97 termed herein the "path" hole. Caddie 13 also has an asymmetrical pattern of holes 90'–94' in the first quadrant and holes 95'–97' in the fourth quadrant. When properly positioned in receptacle column 11, light for optical path 54 passes through hole 97', the "path" hole for path 54.

Except for holes 97 and 97', the caddies may have different hole patterns to allow one to be distinguished from another. When a cartridge is put into the input/output station light path 53 is interrupted until the cartridge is seated. When properly seated, light passes through a common hole in the cartridge and caddie.

As a caddie is removed from a cartridge in the I/O station by the picker 22, the optical path 53 observes a pulse signature comprising a relatively short blocked period illustrated in FIG. 5 as 4 pulse periods, followed by two short pulses of two pulse periods each as light passes through holes 96 and 95. A four pulse blocked period is encountered between holes 96 and 95. The signature then encounters a long blocked period of 16 pulse periods followed by four short pulses each two pulse periods long separated by 4 pulse blocked periods. This is followed by a four pulse blocked period and a pulse 4 periods long before a blocked period 8 pulse periods long. Should caddie be mispositioned or moved improperly such that the signature is unexpected, the caddie can be reinserted and removed a second time. If the signature is still unexpected, the host is notified. Assuming the caddie has an expected signature, it is put into a receptacle. When a caddie is inserted into a receptacle in column 11, the pulse signature observed by optical path 53 is the reverse signature to the removal signature described above.

When the picker mechanism removes the caddie from a receptacle in column 12, holes in quadrants two and three generate a signature with the same sequence of signals as removing a caddie from a location in column 11. Similarly, when the picker places a caddie into column 12, the signature is the same as a put into column 11. The optical path system in the receptacle columns can observe both the pick and the put and provide an indication of the success of the picker operation.

While FIG. 5 illustrates a particular set of holes with particular diameters and spacings, any suitable size and spacings can be used. If desired, the particular size and spacings can provide special information about the disk, that is identification data, and thereby serve a data purpose as well as a process purpose. If desired, more than one row of holes can be used together with multiple optical paths for each of the receptacle columns.

Figures 6A, 6B:
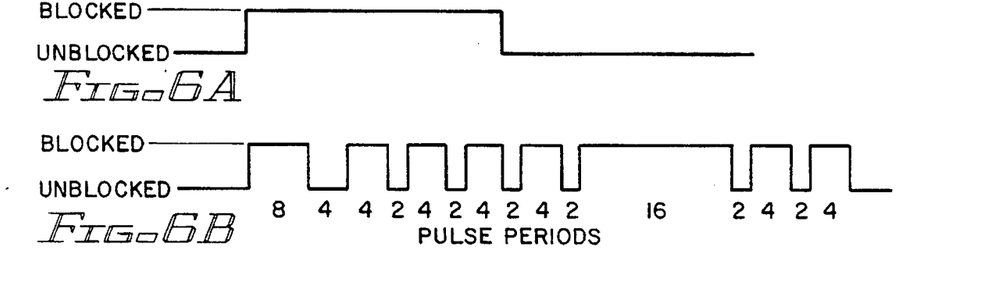
FIGS. 6A–6C show a representation of the electrical output of the sensor unit when the caddie of FIG. 5 is drawn through the optical sensors and when the cartridge is manually moved.
Figure 6C:
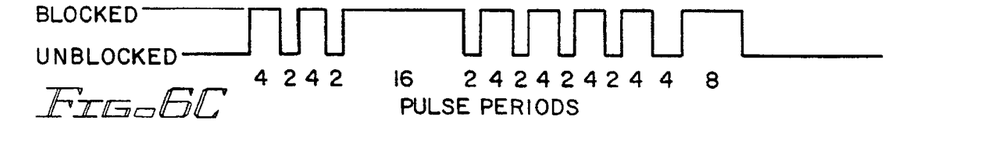

FIGS. 6A–6C show the sensor output signal corresponding to the specific pattern of holes shown in FIG. 5. When a cartridge is manually inserted into the I/O station of a receptacle column, FIG. 6A shows the signal pattern that results. The optical path 53 is blocked for a long period which culminates with hole 97 positioned in the optical path 53 for an indeterminate period indicating that the cartridge is in proper position within the I/O station or the receptacle column. The above described pulse is reversed when a cartridge is manually removed from the I/O station.

When the picker mechanism inserts a caddie into a receptacle column, termed a "put" operation, FIG. 6B illustrates that an 8 pulse blocked period is followed by a four pulse unblocked period as hole 90 passes through optical path 53 or as hole 90' passes through optical path 54. A four pulse blocked period is then followed by four pulses each two periods long separated by three blocked periods each four pulses long as the holes continue to pass through optical path 53 or 54. The pulse train continues to form as shown in FIG. 6B until the caddie is properly positioned in the receptacle column with hole 97 or hole 97' in the optical path.

The pulse train is reversed when the picker mechanism removes a caddie from the receptacle column, termed a "pick" operation. A four pulse blocked period is followed by a two pulse unblocked period as hole 96 passes through optical path 53. A blocked period of four pulses is followed by an unblocked period of two pulses for hole 95 followed by a blocked period of 16 pulses before a two pulse unblocked period for hole 94. The pulse train continues to form as shown in FIG. 6C until the caddie is completely removed from the receptacle column. The pulse train is the same as that shown in FIG. 6C for a pick from receptacle column 11.

Thus, if no deviations from the expected pulse trains shown in FIGS. 6A–6C are encountered, the optical sensing system identifies successful picker inserts, successful picker picks and also identifies manual caddie removal or insertion. If deviations are encountered, appropriate error recovery may be initiated.

As FIG. 5 shows, the holes 90'–97' are the mirror image flipped by 180 degrees of holes 90–97. As a result, the caddie may take either a 0° or a 180° orientation in the storage slots of either receptacle column without altering the signatures sensed during the insertion and removal operations.

Figure 9A:
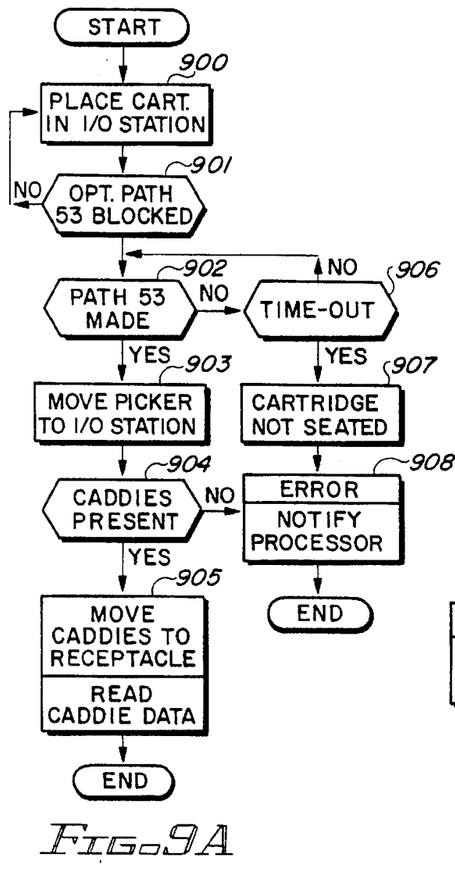
FIGS. 9A–9B show the process followed upon insertion and removal of a cartridge into or from the I/O station.

FIG. 9A shows the process followed when a cartridge is manually inserted into the I/O station and the picker moves caddies contained in the cartridge to locations within the receptacle columns. When a cartridge is manually inserted, a signal pattern like that shown in FIG. 6A is sensed. Light is present in optical path 53 at step 900 until the cartridge is inserted and blocks the light as shown at step 901. When the cartridge is properly positioned, optical path 53 is unblocked as shown at step 902. The picker is moved to the I/O station at step 903 and if caddies are present at step 904, the picker moves them to receptacle locations at step 905. If the caddies are provided with hole patterns as shown in FIG. 5, it is possible to identify the caddie from the pattern of signals that results when the caddie is removed from the I/O station by the picker. If identifying data is not present in the hole pattern, the picker may move the media unit to a drive in order to identify the disk before moving it to a receptacle column.

If a problem occurs in manually inserting the cartridge, the signal pattern expected at step 902 will not occur and a query is made at step 906 whether a time out period, such as 30 seconds for example, has elapsed. If it has, the cartridge is probably stuck or not seated properly in the I/O station as indicated at step 907, thereupon resulting in an error condition signal at step 908. Similarly, at step 904, if a cartridge was loaded successfully but contained no caddies, the error condition signal is activated.

Figure 9B:
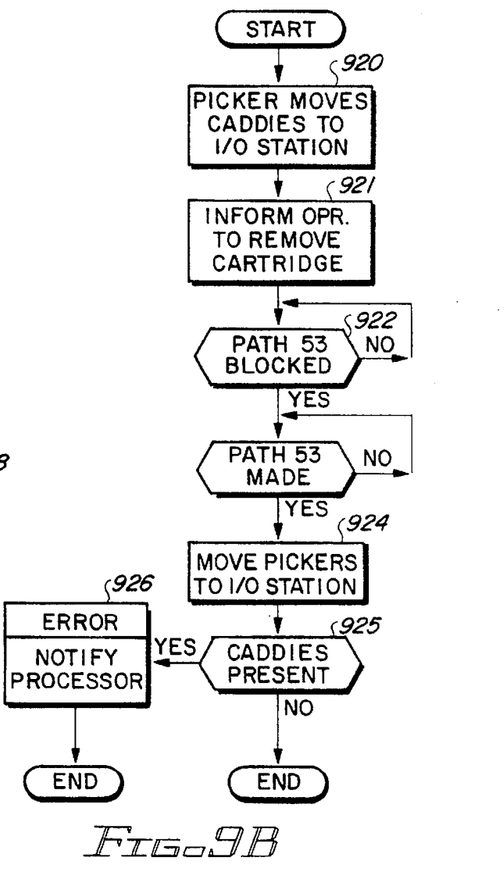

FIG. 9B shows the organization of the process followed when caddies are to be removed from the library. In this case, the caddies are assembled into a cartridge located in the I/O station as shown at step 920. The signal pattern shown in FIG. 6B is observed as each caddie is successfully put into the I/O station by the picker 22. When all caddies have been assembled in the cartridge, the operator is requested to remove the cartridge as shown at step 921. When the cartridge is removed, a signal pattern similar to that shown in FIG. 6A is observed in steps 922 and 923. To check the removal operation, the picker may be moved to the I/O station at step 924 to search for caddies at step 925. If none are found, the removal operation is finished. If, however, a caddie is present an error signal is activated at step 926.

Figure 7:
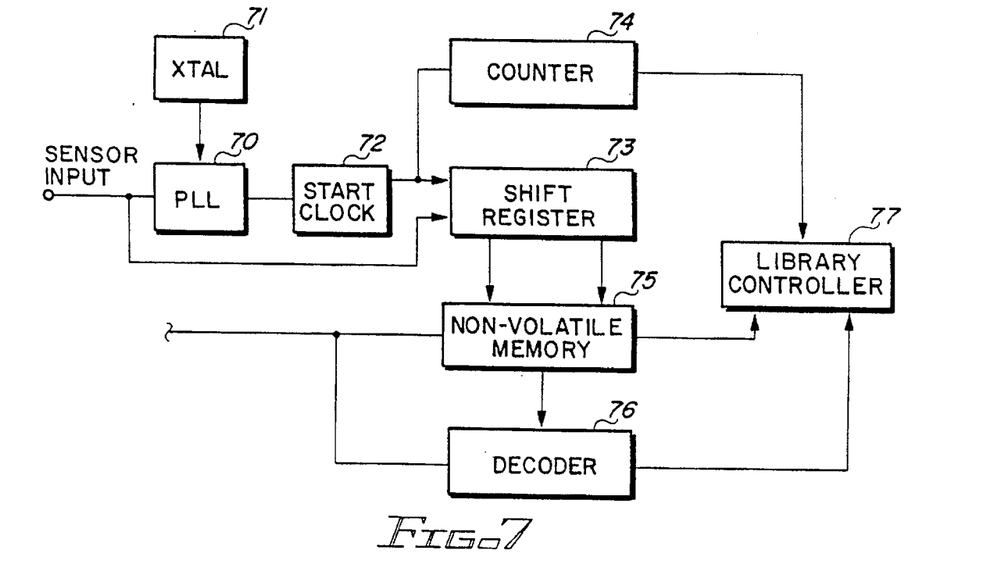
FIG. 7 shows an electrical circuit for handling the sensor output of FIG. 6.

Logic circuits are shown in FIG. 7 to work in conjunction with a hole pattern such as shown in FIG. 5 and the resulting sensor signal output of FIG. 6. A phase locked loop circuit 70 receives sensor signals and oscillator signals from crystal oscillator 71 in order to coordinate sensor input signals with the oscillator signals for establishing the start clock 72. The signature provided by the sensor input is placed into shift register 73. A counter 74 is provided to count the number of pulses, in the incoming signal. Output from the counter 74 is sent to the library controller 77.

A signature present in shift register 73 is transferred to non-volatile memory 75 and decoder 76. The decoded signature is sent to the library controller where the meaning of the decoded signal is quantified. For example, the proper completion of the pick or put operation is recognized together with any informational content contained in the signature. Note that non-volatile memory may also be read to the library controller 77 for error recovery. The controller has decoding software to perform the decoding function and thereby provide for error recovery.

Figure 8:
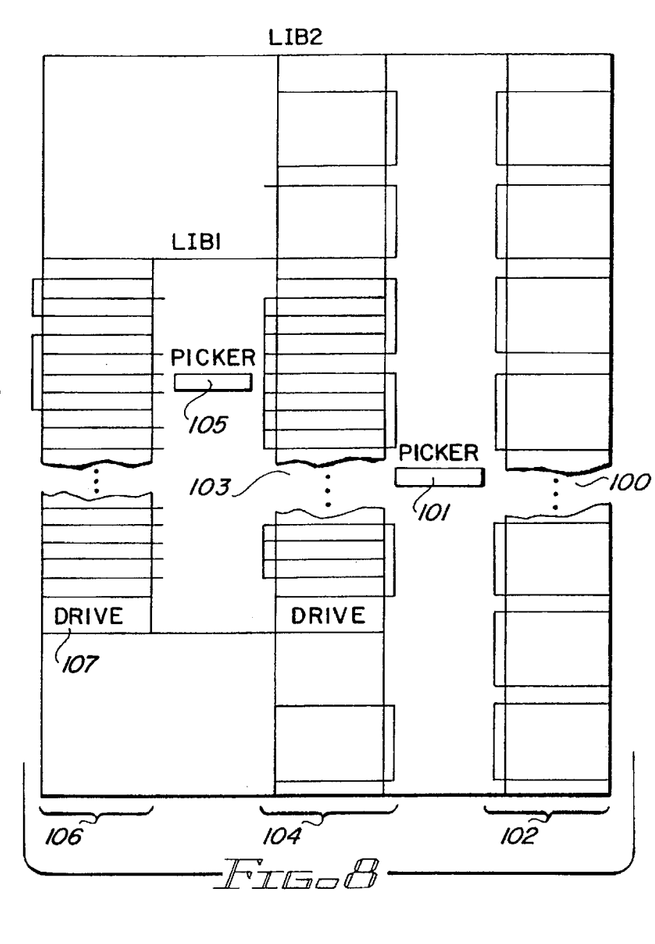
FIG. 8 shows an alternative storage library configuration.

FIG. 8 shows another library design which advantageously employs the cartridges and caddies disclosed herein. In FIG. 8, an I/O station 100 is used to manually load or unload media units, preferably positioned in cartridges. Picker system 101 moves cartridges/media units to and from receptacle locations in column 102 and to and from I/O station 103 in column 104. Picker system 105 moves caddies to and from receptacle locations in columns 104 and 106. Drive units 107 are loaded and unloaded by picker system 105.

The library structure shown in FIG. 8 lends itself to a hierarchical storage system in which more frequently used disks can be located in Lib. 1 columns 104 and 106 while less frequently used disks are stored in column 104 and 102 in Lib. 2.

While the invention has been described above with respect to a specific embodiment it will be understood by those skilled in the art that various changes in form and detail may be made therein without departing from the spirit and scope of the invention. For example, a bar code reader could be placed within the receptacle column so that a bar code placed on the caddie could be read. Such an arrangement can identify the disk in the caddie and is a technique that can replace or supplement the hole pattern shown in FIG. 5 for providing identifying data. Again, changes in form and detail do not depart from the spirit and scope of the invention which receives definition in the following claims.

What is claimed is:

1. A library system for storing media units which are used in conjunction with a storage drive, each of said media units comprising a storage disk and a caddie for holding the disk, said caddie having a path hole through which an optical path passes when said caddie is properly positioned within said library, said library system comprising:

a receptacle column with a top surface, two side surfaces, a back surface, open on the front with a succession of rails located therein defining storage spaces for holding a plurality of said media units;

a picker assembly for accessing said media units through the open front, said picker assembly capable of moving said media units to and from said storage spaces within said receptacle column;

optical sensor elements located in said receptacle column, said sensor elements including a light emitting element and a light sensing element, said optical path for the light produced by said light emitting element extending through said storage spaces for holding said media units, and if said media units are present, through said path hole in each said media unit to said light sensing element, said media units including a first plurality of holes located in each said caddie such that at least a portion of said first plurality of holes are drawn through said optical path whenever each said caddie is moved by said picker assembly from a stationary position in said receptacle column or placed into a stationary position in said receptacle column;

a library controller;

said sensor elements connected to said library controller to provide a first signature comprising a first succession of signals produced when said first plurality of holes in one of said media units is moved through said optical path when said media unit is removed from said receptacle column by said picker assembly and a reverse first signature comprising a reverse first succession of signals when one of said media units is put into said receptacle column by said picker assembly;

said library controller thereby enabled to receive the first signature and when a received first signature is an unexpected combination of signals, means for signalling said picker assembly to move said media unit for a second attempt, and if an expected first signature is received, means for signalling said picker assembly to move said media unit to a second of said storage locations; and said library controller enabled to receive said reverse first signature upon insertion of said media unit into said second storage location, and when said reverse first signature is an unexpected combination of signals, means for signalling said picker assembly to move said media unit into said second storage location a second time, and if an expected reverse first signature is received, means for signalling said picker assembly to leave said media unit in said second storage location.

2. The library system of claim 1 further including:

a cartridge adapted to hold a plurality of media units, said cartridge sized to fit between said rails in said receptacle column, said cartridge having a top surface with a transparent portion and a bottom surface with a transparent portion for enabling said optical path to pass through said cartridge when said cartridge is seated within said receptacle column.

3. The library system of claim 2 further including:

an input/output (I/O) station located in said receptacle column, said I/O station having two side surfaces with rails located therein defining a space for holding a cartridge, said I/O station open at both the front and back of said receptacle column, the open back mating with a slot in said back surface of said receptacle column providing manual access to remove and load said cartridge from and to said I/O station;

said picker assembly for moving said media units from and to said I/O station and to and from said storage spaces within said receptacle column;

said library controller enabled to sense the insertion of said cartridge at said I/O station through an insertion signal pattern received from said optical elements when the transparent portions and non-transparent portions of said cartridge are drawn through said optical path, thereby signalling means for activating said picker assembly to move said media units from said I/O station to said storage locations; and said library controller enabled to sense the removal of said cartridge at said I/O station through a removal signal pattern received from said optical elements when the transparent and non-transparent portions of said cartridge are drawn through said optical path, thereby signalling said picker assembly to check said I/O station for the presence of said media units and signalling error if one is found.

4. The library system of claim 3 further including said storage drive positioned for access by said picker assembly for insertion and removal of said media units into and out of said drive, and wherein said library controller is enabled to signal said picker assembly to successively move each one of said media units from said I/O station to said storage drive upon receiving said insertion signal pattern and from said storage drive to one of said storage locations, thereby enabling said storage drive to provide said library controller with the identity of each one of the media units inserted at said I/O station and providing said library controller with the identity of that storage location into which each one of said media units are stored.

5. The library system of claim 4 further including:

a second receptacle column with a top surface, two side surfaces, a back surface, open on the front with a succession of rails located therein defining storage spaces for holding a plurality of said media units, said picker assembly arranged to move said media units to and from the storage spaces in said second column as well as to and from the storage spaces in said first column including said I/O station.

6. The library system of claim 5 further including:

a second optical path located in said second receptacle column extending through the storage spaces in said second column, and if said media units are present, extending through a second path hole in each said media unit, said media units including a second plurality of holes located in each said caddie such that at least a portion of said second plurality of holes are drawn through said second optical path whenever each said caddie is moved by said picker assembly to and from said storage spaces in said second column, said second plurality of holes providing for a succession of signals that produces said reverse first signature identifying a properly completed insertion and a different succession of signals producing said first signature to identify a properly completed removal, said library controller receiving said signals and thereby enabled to monitor and control picker operation in said second receptacle column.

7. The library system of claim 1 further including:

a second receptacle column with a top surface, two side surfaces, a back surface, open on the front with a succession of rails located therein defining storage spaces for holding a plurality of said media units, said picker assembly arranged to move said media units to and from the storage spaces in said second column as well as to and from the storage spaces in said first column including said I/O station; and a second optical path located in said second receptacle column extending through the storage spaces in said second column, and if said media units are present, extending through a second path hole in each said media unit, said media units including a second plurality of holes located in each said caddie such that at least a portion of said second plurality of holes are drawn through said second optical path whenever each said caddie is moved by said picker assembly to and from said storage spaces in said second column, said second plurality of holes providing for a succession of signals that produces said reverse first signature identifying a properly completed insertion and a different succession of signals producing said first signature to identify a properly completed removal, said library controller receiving said signals and thereby enabled to monitor and control picker operation in said second receptacle column.

8. The library system of claim 7 wherein said second plurality of holes is a mirror image flipped by 180 degrees of said first plurality of holes thereby enabling each said media unit to take either a first orientation or a second orientation 180° removed from said first orientation without altering said first signature indicating a removal operation or said reverse first signature indicating an insertion operation whether said media unit is stored in said first or said second receptacle column.

9. A caddie for holding a recording disk for use in a library of recording disks wherein said library has at least two receptacle columns with storage spaces therein for holding a plurality of media units, a library controller and a picker assembly for moving said media units between said storage spaces and at least one storage drive, each said media unit comprised of said caddie and a recording disk positioned therein, said library having a first optical path extending through said storage spaces in a first receptacle column, and a second optical path extending through said storage spaces in a second receptacle column, said caddie comprising:

a first path hole through which said first optical path passes when said caddie is properly positioned in said first receptacle column, and a second path hole through which said second optical path passes when said caddie is properly positioned in said second receptacle column;

a first plurality of holes located in said caddie such that at least a portion of said first plurality of holes are drawn through said first optical path when said caddie is moved by said picker assembly from a stationary position in said first receptacle column or placed into a stationary position in said first receptacle column, and a second plurality of holes located in said caddie such that at least a portion of said second plurality of holes are drawn through said second optical path when said caddie is moved by said picker assembly from a stationary position in said second receptacle column or placed into a stationary position in said second receptacle column; and said first and said second plurality of holes interacting with said first and said second optical paths to produce a first signature when said picker assembly removes one of said media units from one of said storage locations and a reverse first signature when said picker assembly inserts one of said media units into one of said storage locations, said second plurality of holes being the mirror image flipped by 180 degrees of said first plurality of holes thereby enabling each said media unit to take either a first orientation or a second orientation 180° removed from said first orientation without altering said first signature indicating a removal operation or said reverse first signature indicating an insertion whether said media unit is stored in said first or said second receptacle column.

10. A cartridge adapted to hold a plurality of the caddies of claim 9, said cartridge comprising a top surface with transparent portions located therein and a bottom surface with transparent portions located therein such that said first and said second optical paths can pass through said cartridge and the path holes located in the caddie when said cartridge is seated in said first and said second receptacle columns and said caddies are properly positioned in said cartridge.

11. A method of monitoring and controlling the operation of a storage library, said library including at least one receptacle column with a plurality of storage spaces for holding media units, a library processor, optical elements located within said receptacle column to provide an optical path extending through said storage spaces, said optical elements connected to said processor for supplying signals to said processor, said media units each comprising a recording disk and a caddie for holding each said recording disk, said caddies having a plurality of holes through which said optical path can pass, said receptacle column including a input/output (I/O) station for receiving said media units, a picker assembly for moving said media units from and to said I/O station and to and from said storage spaces, said method comprising the steps of:

providing said storage library;

providing said plurality of holes in said caddie at different specific spacings, said holes having a variety of specific sizes so that when said caddie is moved from said I/O station by said picker assembly, the successive blocking and unblocking of said optical path will produce a unique succession of signals for transfer to said processor for identifying a properly performed insertion operation or a properly performed removal operation, thereby enabling said processor to monitor and control said library; and said holes providing a first signature for a proper insertion operation and a second signature which is the reverse of said first signature for a proper removal operation.

12. The method of claim 11 wherein said library further includes a cartridge adapted to hold a plurality of media units, said cartridge sized to fit between said rails in said receptacle column, said cartridge having a top surface with a transparent portion and a bottom surface with a transparent portion for enabling said optical path to pass through said cartridge when said cartridge is seated within said receptacle column, said media units positioned within said cartridge such that said optical path can pass through one of said plurality of holes in each of said media units within said cartridge, said input/output (I/O) station located in said receptacle column, said I/O station having two side surfaces with rails located therein defining a space for holding said cartridge, said I/O station open at both the front and back of said receptacle column, the open back mating with a slot in said back surface of said receptacle column providing manual access to remove and load said media units from and to said I/O station, said picker assembly for moving said media units from and to said I/O station and to and from said storage spaces within said receptacle column, said method further including the steps of:

providing said library controller for the receiving of an insertion signal pattern from said optical elements to sense the insertion of said cartridge at said I/O station and thereupon providing for signalling said picker assembly to move said media units from said I/O station to one of said storage locations; and providing said library controller for the receiving of a removal signal pattern from said optical elements to sense the removal of a cartridge from said I/O station and thereupon providing for signalling said picker assembly to move to said I/O station to check for the presence of media units, and if one is found, providing for an error signal.

13. The method of claim 12 wherein said library further includes a storage drive, further including the steps of:

providing said library controller with the capability of signalling said picker assembly to move to said I/O station upon receiving an insertion signal pattern, said picker assembly successively moving each one of said media units to said storage drive thereby enabling said storage drive to provide said library controller with the identity of the recording disk in each of said media units, and thereafter moving each one of said media units to one of said storage locations thereby enabling said library controller to identify and log that storage location to which each of the media units inserted at said I/O station is moved.

* * * * *